Aug. 21, 1951  W. G. SCHARMANN  2,565,395
PRODUCTION OF HYDROGEN FROM HYDROCARBON GASES
Filed June 17, 1947
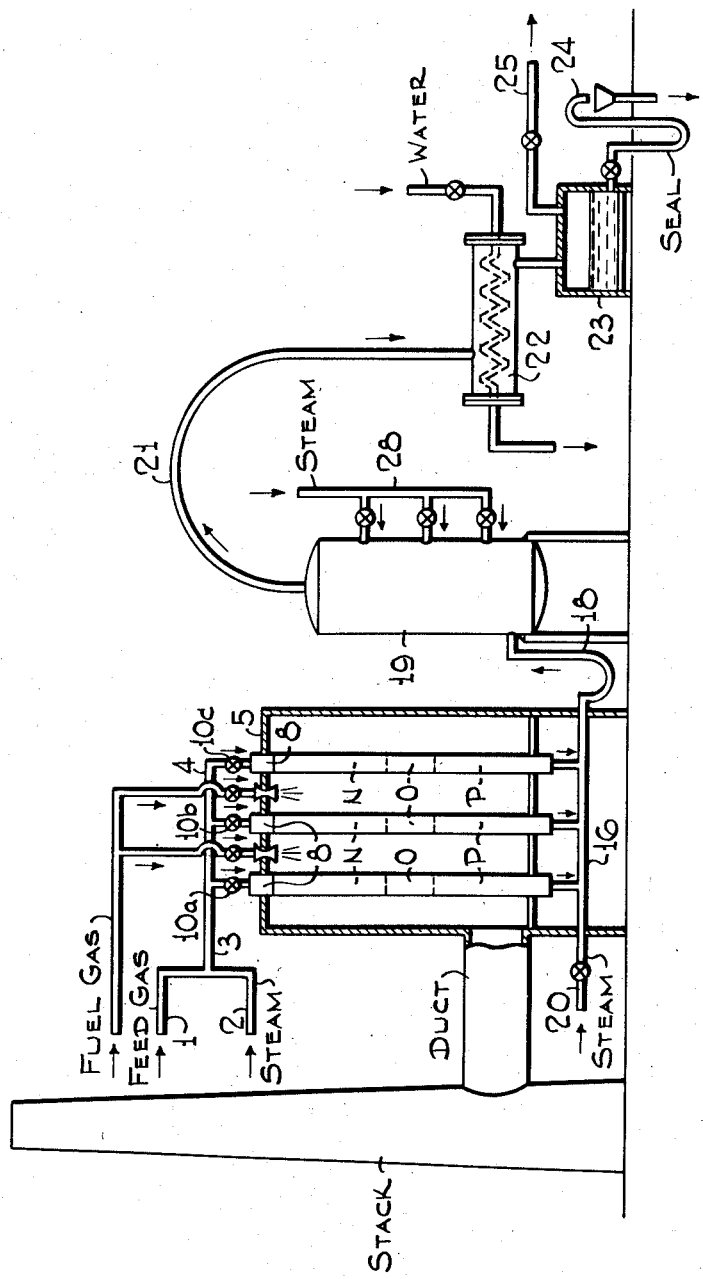
Walter G. Scharmann  Inventor
By J. Cashman  Attorney Patented Aug. 21, 1951

2,565,395

UNITED STATES PATENT OFFICE 2,565,395

PRODUCTION OF HYDROGEN FROM HYDROCARBON GASES

Walter G. Scharmann, Westfield, N. J., assignor to Standard Oil Development Company, a corporation of Delaware Application June 17, 1947, Serial No. 755,112

18 Claims. (Cl. 23—212)

The present invention relates to an improved process for the production of hydrogen, or gaseous mixtures rich in hydrogen, from hydrocarbon gases by a catalytic conversion with a mild oxidizing gas such as steam and/or carbon dioxide. More particularly, the invention refers to an improved method of operating a process of this type whereby coking of the catalyst may be prevented or at least substantially reduced. The invention will be fully understood from the following description and the drawing which illustrates one form of apparatus suitable for the purpose.

In the manufacture of hydrogen by the reaction of hydrocarbons such as methane or higher members of the paraffinic series with steam at elevated temperatures, it is generally the practice to use catalytic masses containing an iron group metal, particularly nickel, diluted with metal oxides which are not reducible by hydrogen at the reaction temperatures, such as magnesium oxide, alumina, silica, or mixtures or compounds thereof in various proportions.

The higher the activity of these catalysts for the conversion of paraffinic hydrocarbon gases with steam into $H_2$ and CO the greater is normally their activity for the cracking of unsaturated hydrocarbons, such as gaseous olefins, directly into $H_2$ and carbon. Catalysts of lower activity in the paraffin gas-steam conversion, on the other hand, have usually a satisfactory activity for the conversion of olefins with steam into $H_2$ and carbon oxides. Cracking of olefins and the resulting formation of carbon lead to coking of the catalyst and a severe reduction of catalyst activity and utility.

Therefore, in the production of gases rich in hydrogen by the conversion of hydrocarbon gases containing olefines, such as refinery gases, with steam in the presence of highly active conversion catalysts of the type mentioned above, care must be taken to prevent or substantially eliminate olefin cracking and catalyst coking. For this purpose, it has been suggested to pass the reacting mixture of hydrocarbon gases and steam in series over a plurality of catalyst layers of increasing activity for the conversion of paraffinic gases. The activity of the consecutive catalyst layers may be increased by a suitable increase of their nickel or other group VIII metal content. In this procedure, the catalyst layers of lowest paraffin-conversion activity which are first contacted cause, as a result of their adequate olefin-conversion activity, the substantially complete conversion of olefins into carbon oxides and $H_2$. When the reacting gases reach the catalyst layers of highest paraffin-conversion activity they are practically free of olefins and coking is avoided.

This process operates satisfactorily with isolated specific catalyst compositions. However, it has been observed that the most common low-activity paraffin-conversion catalysts fail to eliminate completely the olefins in the early catalyst stages with the result that a certain amount of coking takes place in the high activity stages, particularly during the starting period of the process.

The present invention overcomes this difficulty and affords various additional advantages which will be fully understood from the following detailed description of the invention.

It is, therefore, the principal object of the present invention to provide improved means for producing a gas rich in hydrogen by the catalytic conversion of hydrocarbon gases containing unsaturates with a mild oxidizing gas, such as steam and/or carbon dioxide.

A more specific object of the invention is to provide means for eliminating catalyst coking in a process of the type specified.

Other objects and advantages will appear hereinafter.

It has been found that catalysts which normally have a low activity for the conversion of paraffinic gases but satisfactory activity for the conversion of olefins with a mild oxidizing gas, such as steam and/or $CO_2$, may be activated by a pretreatment particularly with olefins for a suitable time to reach full activity for the conversion of olefins. Experiments have shown that the activity of fresh catalysts of this type is so low that at feed rates used during normal operation of the conversion process, say, at hydrocarbon feed rates of about 600 v./v./hr. over the low activity catalyst, most of the olefins remain unconverted, reach the high activity catalyst layers and cause coking of the latter. However, after a treatment with olefins for a suitable length of time these catalysts reach highest activity and convert olefins substantially completely even at hydrocarbon feed rates above 600 v./v./hr.

Based on these discoveries, the invention proposes to allow for an activation period of suitable length in starting up the process. This may be accomplished by first passing the olefin-containing feed gas at conversion temperatures through consecutive catalyst layers of increasing activity at a reduced space velocity of less than, say, about 150 v./v./hr. of hydrocarbon feed based on the layer of lowest activity for a feed consisting essentially of hydrocarbons having up to 5 carbon atoms. For hydrocarbons of higher molecular weight correspondingly lower feed rates should be used. Quite generally, it may be stated that hydrocarbon space velocities of about 15–35% of the ultimate normal hydrocarbon space velocity are suitable for starting up the process. The ultimate normal hydrocarbon space velocity varies as just stated with the molecular weight of the hydrocarbons and may be so chosen as to correspond to a production of about 500–2500, preferably 800–1500 volumes of $H_2+CO$ per volume of catalyst space, under atmospheric pressure. The space velocity is then increased as the activity of the olefin-conversion catalysts increases. The necessary duration and optimum acceleration of this activation period depends mainly on the specific composition of the hydrocarbon feed and the catalysts and may be determined by simple tests carried out with low activity olefin-conversion catalyst alone in separate test equipment. Satisfactory results may generally be obtained when the original space velocity is maintained for about 10–50 hours and the space velocity is thereafter increased by about 20%–60% of the throughput at the time of change in intervals of about 10–40 hours until the space velocity desired for normal operation is reached.

Low activity conversion catalysts suitable for the process of the invention may contain about 8–12% by weight of group VIII metal, particularly nickel. High activity catalysts for the conversion of paraffins should contain at least 15%, and may contain as much as 30%, of active metal. The remainder of these catalysts may consist of difficultly reducible metal oxides such as alumina, magnesia, etc., and/or siliceous materials such as kaoline, aluminum cement, etc. Conversion temperatures may vary between about 900°–1400° F. on the catalyst layers first contacted by the feed and about 1300°–1600° F. on the catalyst layers last contacted by the reaction mixture. The amount of steam required for the conversion of the hydrocarbon feed depends on the character of the hydrocarbons to be converted. In normal operation it is preferred to use an excess amount of steam above that theoretically required to convert all of the carbon in the feed hydrocarbons to carbon monoxide. This excess may amount to about 50–150%. However, during the activation period this excess is preferably controlled at a level of about 250–350% in order to improve conversion during the time of lowest catalyst activity. Normal operating conditions may be reached by merely holding the original steam feed rate constant and increasing the hydrocarbon feed rate as described above until a desired hydrocarbon feed rate is established, whereupon the steam feed rate may be further adjusted as required.

While the procedure described above constitutes the preferred and most efficient embodiment of the invention, it should be understood that the activation treatment of the olefin-conversion catalyst of low activity may be carried out independently of the process for converting the paraffinic gases and in the absence of subsequent high activity paraffin-conversion catalysts. In this case, a careful control of the hydrocarbon feed rate during the activation period is less essential.

Having set forth its objects and general nature, the invention will be best understood from the following more detailed description and specific examples read with reference to the accompanying drawing.

Referring now in detail to the drawing, reference numeral 1 indicates the gas line supplying low-sulfur olefin-containing natural or refinery gas from any suitable sources not shown.

A furnace adapted to be fired with oil or gas is shown at 5. Feed gas, and steam entering through lines 1 and 2, respectively, if desired after preheating, are passed through line 3 to a manifold 4 from which the mixture is distributed among reaction tubes 8 of which only three are shown connected in parallel and mounted in furnace 5. These tubes are filled with suitable catalyst layers N, O, and P of increasing activity which will be described more fully below. The tubes are connected to the manifold 4 through separate lines fitted with valves 10a, 10b and 10c and the gas discharged from the tubes is collected in a manifold 16.

Gases from manifold 16 may be conducted by pipe 18 to a further reaction zone which comprises a catalyst drum 19. Additional steam may be added to manifold 16 by means of pipe 20 and gases discharged from this secondary reaction pass by line 21 into cooler 22. Cooled gas passes therefrom into a separator 23, from which water is withdrawn through line 24 and gas through line 25.

The operation of the process as described to this point is conventional. Natural gas or refinery gases comprising hydrocarbons of a paraffin and olefin series may be converted by means of steam to produce carbon monoxide or carbon dioxide and hydrogen. It is desirable to remove at least the major quantity of sulphur from the feed, in the form of hydrogen sulfide or mercaptans, by means of a caustic wash or otherwise.

The reformation reaction occurs in tubes 8 at a temperature above about 1000° F. with an excess of steam in the presence of catalysts comprising nickel with or without other elements or compounds such as alumina, magnesia, siliceous materials such as kaoline and the like. This reaction results in the formation of hydrogen, carbon monoxide and, some carbon dioxide. If it is desired to recover a gas of this composition, vessel 19 may have the form and function of a waste-heat boiler or may be completely omitted.

The reaction mixture may also be passed from the first stage into the second stage 19 operating as a catalyst converter at a much lower temperature, for example about 800° F. and a further excess of steam may be added through line 20 and if desired through manifold 28 to the gases and/or to various catalyst zones within reactor 19. In this step, carbon monoxide produced in the first stage is converted into carbon dioxide and additional hydrogen. The second reaction may be catalyzed by a number of suitable materials, of which iron oxide is perhaps the most advantageous. The gas mixture is then suitably cooled and carbon dioxide can be removed in any conventional manner to produce a gas consisting essentially of hydrogen with small amounts of unconverted methane which is usually not over 1 or 2%.

As stated above, the catalyst mass in tubes 8 consists of several layers N, O and P, the activity of which increases from the top to the bottom of tubes 8 as the result of an increased active metal content. Typical catalyst analyses of the various layers are as follows:

Per cent by weight

Layers N:
NiO _____ 10
$Al_2O_3$ _____ 7
MgO _____ 3
Aluminum cement _____ 80

Layers O:
NiO _____ 16.5
$Al_2O_3$ _____ 16.5
MgO _____ 0.0
Aluminum cement _____ 67.0

Layers P:
NiO _____ 25.0
MgO _____ 14.0
Aluminum cement _____ 28.0
Kaoline _____ 33.0

The present invention is directed to a proper control of the procedure of starting up a process of the type just described. It is desirable for the purposes of the invention to follow a definite schedule for heating up the catalyst tubes 8 to reaction temperature prior to the introduction of feed gases. Briefly, this schedule involves first heating with nitrogen or inert gas supplied through line 1, up to a temperature of about 500°–700° F. This is followed by the addition of steam through line 2 and the mixture of nitrogen and steam is used while heating to a reaction temperature of about 1100°–1300° F. The latter condition may be maintained for about 24 hours whereupon the nitrogen feed in line 1 is replaced by feed gas containing olefins.

Thereafter, the starting-up procedure is continued in accordance with the present invention by first maintaining low feed rates of hydrocarbon gases and steam, respectively and steadily or periodically increasing these feed rates in the course of the subsequent procedure as described above. In this manner, substantially complete olefin conversion to $H_2$ carbon oxides on the first catalyst layers N is accomplished during the entire run and coking of the highly active catalyst layers O and P is practically eliminated.

The invention will be further illustrated by the following specific examples.

EXAMPLE I

An experimental tube was charged exclusively with a catalyst having a composition as specified above for layers N in tubes 8. The tube was heated to provide a temperature gradient of from about 250° F. at the tube inlet to about 1300° F. at the tube outlet. A feed gas consisting of 90% of methane and 10% of propylene was passed through the tube at a space velocity of 600 v./v./hr. together with steam supplied at a space velocity of 1550 v./v./hr. After 164 hours of operation, the product gas had the following composition:

Per cent
$H_2$ _____ 11.1
Unsaturates _____ 7.1
$CH_4$ _____ 78.0

This test shows that the activity of the catalyst for the conversion of both paraffins and olefins was negligible during the first 164 hours.

In a second series of tests, the same catalyst was brought up to temperature and then subjected to a hydrogen pretreatment for 4 hours whereupon steam and natural gas (95% $CH_4$; no olefins) were fed at space velocities of about 1550 v./v./hr. and 550 v./v./hr. respectively. Gas measurements indicated low activity, so, the hydrogen treat was repeated for 12 hours. After operation of 64 hours at 225°–1330° F. inlet to outlet temperature conversion was negligible as demonstrated by the following product gas analysis:

Per cent
$H_2$ _____ 1.0
$CH_4$ _____ 97.0

At the 69th hour about 9.5% of propylene was added to the hydrocarbon feed mixture and the following results were obtained at this time:

Per cent
$H_2$ _____ 5
Unsaturates _____ 6.2
$CH_4$ _____ 86.4

The olefin-conversion still being negligible, these conditions were continued until the 158th hour when the following analysis was taken:

Per cent
$H_2$ _____ 38.0
Unsaturates _____ 1.4
$CH_4$ _____ 47.0

The last analysis demonstrates that a treatment of the catalyst with olefins for about 90 hours at the space velocity indicated had increased considerably the activity of the catalyst for olefin conversion.

EXAMPLE II

The results of a complete test run using the same catalyst as in Example I are summarized below:

Temperature range 250–1200° F.

[Catalyst preheated to 600° F. on inert gas before admitting steam.]

| Hours After Cutting in Feed | Feed (90% $CH_4+10\%$ $C_3H_6$) | Steam | Exit Gas | | |
|---|---|---|---|---|---|
| | | | Unsats. | $CH_4$ | $CO+CO_2$ |
| | V./v./hr. | V./v./hr. | Per cent | Per cent | Per cent |
| 1–24 | 150 | 750 | 3.3 | 24.8 | 8.9 |
| 25–48 | 150 | 750 | 0.6 | 37.8 | 12.6 |
| 49–74 | 235 | 900 | 0.4 | 41.9 | 14.1 |
| 75–96 | 310 | 1,090 | 0.1 | 45.0 | 15.3 |
| 97–112 | 390 | 1,250 | 0.1 | 42.5 | 13.9 |
| 113–124 | 390 | 1,250 | 0.1 | 41.4 | 13.5 |
| 125–148 | 470 | 1,400 | 0.3 | 39.7 | 13.6 |
| 149–177 | 550 | 1,550 | 0.3 | 41.6 | 14.4 |
| 178–201 | 625 | 1,550 | 0.3 | 41.6 | 14.2 |

From these data it is apparent that olefins may be successfully eliminated over catalysts of this type at full feed rates provided a controlled activation procedure in accordance with the invention is applied during the first approximately 200 hours.

EXAMPLE III

In order to demonstrate the utility of the invention in actual operation employing a three-layer catalyst mass, the table given below presents operating conditions and results of a run carried out in a unit of the type illustrated in the drawing using a catalyst arrangement and composition substantially as specified for catalysts N, O and P in the description of the drawing and a hydrocarbon feed consisting of 90% of methane and 10% of propylene. The volume distribution of catalyst layers N, O, P was about 40%, 20% and 40% by volume, respectively.

*Reforming with catalysts N, O and P arranged in layers*

| Run, Hours | Block Temp., °F. | $N_2$ | Hydrocarbon | Steam | Spot Product Samples | | | | |
|---|---|---|---|---|---|---|---|---|---|
| | | | | | Unsats. | $CH_4$ | CO | $CO_2$ | $H_2$ |
| | | v./v./hr. | v./v./hr. | v./v./hr. | Per cent | Per cent | Per cent | Per cent | Per cent |
| 0- 3 | 200- 665 | 565 | ----- | ----- | ----- | ----- | ----- | ----- | ----- |
| 4- 15 | 665-1,400 | 565 | ----- | 1,550 | ----- | ----- | ----- | ----- | ----- |
| 16- 39 | 1,400 | 565 | ----- | 1,500 | ----- | ----- | ----- | ----- | ----- |
| 39- 68 | 1,400 | ----- | 60 | 310 | 0.2 | 11.9 | 3.8 | 15.6 | 62.7 |
| | | | | | 0.4 | 35.6 | 2.3 | 12.9 | 45.0 |
| | | | | | 0.4 | 28.5 | 2.4 | 14.1 | 50.8 |
| 69-116 | 1,400 | ----- | 95 | 375 | 0.2 | 15.1 | 5.5 | 13.4 | 62.9 |
| | | | | | 0.2 | 8.7 | 8.5 | 12.4 | 64.8 |
| 117-161 | 1,450 | ----- | 125 | 435 | 0.1 | 5.2 | 12.8 | 10.0 | 68.4 |
| | | | | | 0.0 | 3.7 | 14.6 | 8.6 | 70.5 |
| | | | | | 0.2 | 2.9 | 13.3 | 8.8 | 66.4 |
| 162-170 | 1,450 | ----- | 155 | 500 | 0.0 | 3.7 | 6.2 | 14.0 | 67.5 |
| 171-260 | 1,500 | ----- | 155 | 500 | 0.2 | 1.8 | 14.5 | 8.7 | 72.0 |
| | | | | | 0.2 | 1.4 | 17.0 | 8.4 | 67.5 |
| | | | | | 0.2 | 0.7 | 16.3 | 8.4 | 70.8 |
| | | | | | 0.3 | 0.7 | 16.2 | 8.2 | 70.8 |
| | | | | | 0.0 | 0.5 | 17.2 | 7.1 | 73.0 |
| | | | | | 0.2 | ----- | 16.6 | 8.3 | 68.2 |
| | | | | | 0.0 | 1.2 | 18.2 | 6.9 | 70.3 |
| 261-286 | 1,500 | ----- | 190 | 560 | 0.2 | 0.4 | 17.5 | 6.9 | 71.4 |
| | | | | | 0.4 | 1.7 | 14.8 | 8.9 | 71.5 |
| 287-332 | 1,500 | ----- | 220 | 620 | 0.2 | 1.9 | 14.9 | 9.2 | 71.3 |
| | | | | | 0.0 | 1.8 | 17.0 | 6.9 | 69.5 |
| 333-357 | 1,500-1,532 | ----- | 250 | 620 | 0.0 | 4.0 | 16.4 | 7.1 | 71.8 |
| | | | | | 0.1 | 3.5 | 17.0 | 6.8 | 69.3 |
| | | | | | 0.0 | 1.5 | 18.2 | 6.8 | 70.2 |
| 358-423 | ¹1,550 | ----- | 250 | 625 | 0.0 | 1.0 | 17.3 | 7.4 | 71.6 |
| | | | | | 0.1 | 0.7 | 18.8 | 6.0 | 71.0 |
| | | | | | 0.0 | 1.5 | 17.4 | 7.4 | 70.6 |
| | | | | | 0.0 | 0.6 | 18.6 | 5.6 | 71.0 |
| | | | | | 0.0 | 0.8 | 20.3 | 6.1 | 69.6 |

¹ Corresponding to temperature in lowest catalyst "P" section of 1450° F. or more.

It is evident from the above data that satisfactory operation is obtained by applying the activation procedure of the present invention. The foregoing description is based on an operation at substantially atmospheric pressure. It should be understood, however, that the process of the invention may be carried out at elevated pressures of about 50-200 lbs. per square inch or higher in a substantially analogous manner, whereby the absolute feed rates and the amounts of product gas per unit of catalyst may be considerably increased.

While the foregoing description and exemplary operations have served to illustrate specific applications and results of my invention, other modifications obvious to those skilled in the art are within the scope of my invention. Only such limitations should be imposed on the invention as are indicated in the appended claims.

I claim:

1. In the process for the production of a gas rich in free hydrogen from a hydrocarbon feed gas containing olefins by conversion with a mild oxidizing gas in the presence of a group VIII metal catalyst having a high activity for the conversion of olefins into hydrogen and carbon oxides at elevated conversion temperatures, the improvement which comprises initially passing the feed mixture over said catalyst at an olefin conversion temperature falling within the approximate range of 900°-1600° F. in the presence of said oxidizing gas at a fraction of the hydrocarbon throughput velocity desirable for the process and gradually increasing said velocity over a period of several days up to the maximum desired hydrocarbon throughput velocity, whereby the activity of the catalyst is raised to said high activity during said several days.

2. The process of claim 1 in which said catalyst contains about 8-12% of nickel and a major proportion of difficulty reducible metal oxides.

3. In the process of producing a gas rich in free hydrogen from a hydrocarbon feed gas mixture containing saturated and unsaturated constituents by passing said mixture together with a mild oxidizing gas at an elevated conversion temperature consecutively over a plurality of group VIII metal catalyst layers, the activity of which for the conversion of saturated constituents and for the cracking of unsaturated constituents increases in the direction of the flow of the hydrocarbon feed, the catalyst of the first layer having a high activity for the conversion of unsaturated constituents into hydrogen and carbon oxides at the conversion temperature, the improvement which comprises initially passing the feed mixture over said first layer catalyst at an olefin conversion temperature falling within the approximate range of 900°-1600° F. in the presence of said oxidizing gas at a fraction of the hydrocarbon throughput velocity desirable for the process and gradually increasing said velocity over a period of several days up to the maximum desired hydrocarbon throughput velocity, whereby the activity of said first layer is raised during said several days sufficient to convert said unsaturated constituents substantially completely at process conditions and to prevent appreciable amounts of unsaturated hydrocarbons from contacting catalyst used in subsequent catalyst layers.

4. The process of claim 3, wherein said pretreatment is carried out in situ.

5. The process of claim 3 wherein product withdrawn from the last of said layers is reacted with steam to convert CO to $CO_2$, and $CO_2$ is removed from the gas mixture produced in said last mentioned reaction.

6. In the process of producing a gas rich in free hydrogen from a hydrocarbon mixture containing saturated and unsaturated constituents by passing said mixture together with steam at an elevated conversion temperature consecutively over a plurality of group VIII metal catalyst layers, the activity of which for the conversion of saturated constituents and for the cracking of unsaturated constituents increases in the direction of the flow of the hydrocarbon feed, the catalyst of the first layer having a high activity for the conversion of unsaturated constituents into hydrogen and carbon oxides at the conversion temperature, the steps of starting up the process which comprise heating said catalyst layers to said conversion temperature, passing said hydrocarbon mixture and steam through said layers in the direction indicated at a hydrocarbon throughput low enough to permit substantially complete conversion of unsaturated constituents into $H_2$ and carbon oxides in said first catalyst layer and amounting to a fraction of the throughput desirable for said process, and increasing the hydrocarbon throughput velocity gradually over a period of several days up to the maximum desired hydrocarbon throughput velocity for said process whereby the activity of said first catalyst layer for said complete conversion is gradually increased so as to prevent appreciable amounts of unsaturated constituents from contacting said catalyst layers having a high cracking activity for unsaturated constituents.

7. The process of claim 6 in which said low throughput of said hydrocarbon mixture is about 15—35% of said desirable throughput, said desirable throughput corresponding to a production of about 800–2000 volumes of $H_2$ + CO, and said desirable throughput is reached by incremental increases of about 20–60% in intervals of about 10–40 hours.

8. The process of claim 6 in which said catalyst layers are heated to conversion temperature by first heating in a nitrogen atmosphere and then replacing the nitrogen with steam.

9. The process of claim 6 in which said conversion temperature falls within the range of about 900°–1600°F.

10. The process of claim 6 in which a large excess of steam is used during the starting-up of the process.

11. The process of claim 10 wherein said excess of steam as about 250 to 350% of the theoretical amount.

12. The process of claim 10 wherein the absolute steam feed rate employed during the starting-up period is substantially maintained throughout said process and the excess of steam is reduced by increasing the hydrocarbon feed rate as the starting-up period advances and the production period is approached.

13. The process of claim 6 in which said catalysts contain nickel in amounts increasing in the direction of the hydrocarbon feed.

14. The process of claim 13 in which said first catalyst layer contains about 8–12% of nickel and subsequent catalyst layers contain at least about 15% of nickel.

15. The process of claim 14 in which said catalyst layers contain magnesium oxide in addition to nickel.

16. The process of claim 14 in which said catalysts contain a difficultly reducible aluminum compound in addition to nickel.

17. The process of claim 14 in which at least one of said subsequent layers contains a siliceous material in addition to nickel.

18. In the process for the production of a gas rich in free hydrogen from a hydrocarbon gas containing olefins by conversion with a mild oxidizing gas in the presence of a group VIII metal catalyst having a high activity for the conversion of olefins into hydrogen and carbon oxides at elevated conversion temperatures, the improvement which comprises pretreating fresh catalyst at an olefin conversion temperature falling within the approximate range of 900–1600°F. in the presence of said oxidizing gas with a hydrocarbon gas containing a gaseous olefin at a fraction of the hydrocarbon throughput velocity desirable for the process for several days whereby the activity of said catalyst is increased to said high activity and thereafter contacting said pretreated catalyst with olefin containing hydrocarbon feed gas at the maximum desired hydrocarbon throughput velocity.

WALTER G. SCHARMANN.

REFERENCES CITED

The following references are of record in the file of this patent:

UNITED STATES PATENTS

| Number | Name | Date |
|---|---|---|
| 1,673,032 | Williams | June 12, 1928 |
| 1,874,801 | Porter | Aug. 30, 1932 |
| 1,889,530 | Beekley | Nov. 29, 1932 |
| 2,056,911 | Schiller et al. | Oct. 6, 1936 |